United States Patent
Roberts et al.

(10) Patent No.: US 9,048,946 B1
(45) Date of Patent: Jun. 2, 2015

(54) HYBRID RANGING USING AN OUT OF BAND SIGNAL IN OPTICAL NETWORKS

(71) Applicant: Calix, Inc., Petaluma, CA (US)

(72) Inventors: Harold A. Roberts, Excelsior, MN (US); Christopher Thomas Bernard, Wayzata, MN (US)

(73) Assignee: Calix, Inc., Petaluma, CA (US)

( * ) Notice: Subject to any disclaimer, the term of this patent is extended or adjusted under 35 U.S.C. 154(b) by 0 days.

(21) Appl. No.: 14/195,229

(22) Filed: Mar. 3, 2014

(51) Int. Cl.
*H04J 14/00* (2006.01)
*H04B 10/079* (2013.01)

(52) U.S. Cl.
CPC .................... *H04B 10/0795* (2013.01)

(58) Field of Classification Search
CPC . H04J 14/0227; H04J 14/0228; H04J 14/023; H04J 14/0232; H04J 14/0235; H04J 14/0242; H04J 14/0245; H04J 14/0249; H04Q 11/0067
USPC .......... 398/66, 67, 68, 69, 70, 71, 72, 98, 99, 398/100, 58, 25, 33, 79; 370/352, 392, 468, 370/389, 465, 395.4
See application file for complete search history.

(56) References Cited

U.S. PATENT DOCUMENTS 7,630,637 B2 * 12/2009 Mizutani et al. ................ 398/67
8,509,619 B2 * 8/2013 Mukai et al. .................... 398/66

OTHER PUBLICATIONS

Kaminow et al., "Optical Fiber Telecommunications IV B: Systems and Impairments", 2002, pp. 460-461, Publisher: Elsevier Science.

* cited by examiner

*Primary Examiner* — Hanh Phan
(74) *Attorney, Agent, or Firm* — Fogg & Powers LLC

(57) ABSTRACT

A method of ranging comprises broadcasting a discovery request to a plurality of optical network units and receiving a respective discovery response from one or more of the plurality of optical network units. Each respective discovery response is transmitted as an out-of-band signal. The method also comprises approximating a respective out-of-band round trip delay to each corresponding optical network unit based on the respective discovery response; dynamically adjusting a size of a respective quiet window for each optical network unit based on the approximated out-of-band round trip delay; determining when to start the quiet window for each corresponding optical network unit based on the respective approximated out-of-band round trip delay; receiving an in-band ranging signal from the corresponding optical network unit during the respective quiet window; and determining an in-band round trip delay estimate based on the in-band ranging signal received during the respective quiet window.

20 Claims, 4 Drawing Sheets

US 9,048,946 B1

HYBRID RANGING USING AN OUT OF BAND SIGNAL IN OPTICAL NETWORKS

BACKGROUND

Conventional optical networks, such as Gigabit Passive Optical Networks (GPON), 10 Gigabit Passive Optical Networks (XG-PON), or Next Generation Passive Optical Networks (NG-PON), typically perform ranging by sending out a request to optical network units and waiting for a response to come back. During this time, no other units transmit data. Hence, this period of time is often referred to as a quiet window. The quiet window can last up to 500 microseconds, for example. Since all other units, other than one being targeted for ranging, do not transmit during the quiet window, the quiet window adds occasional additional jitter and latency to the upstream data path. This is undesirable for any constant bit rate signals, such as Common Public Radio Interface (CPRI) or Open Base Station Architecture Initiative (OBSAI) for mobile front-haul as well as mobile backhaul traffic.

SUMMARY

In one embodiment, a method of ranging in an optical network is provided. The method comprises broadcasting a discovery request to a plurality of optical network units and receiving a respective discovery response from one or more of the plurality of optical network units. Each respective discovery response is transmitted as an out-of-band signal on a data channel for traffic bearing signals. The method also comprises identifying a respective serial number in each respective discovery response, each respective serial number identifying a corresponding optical network unit; approximating a respective out-of-band round trip delay to each corresponding optical network unit based on the respective discovery response; dynamically adjusting a size of a respective quiet window for each optical network unit from which a discovery response is received based on the approximated out-of-band round trip delay to the corresponding optical network unit; determining when to start the quiet window for each corresponding optical network unit based on the respective approximated out-of-band round trip delay to the corresponding optical network unit; receiving an in-band ranging signal from the corresponding optical network unit during the respective quiet window; and determining an in-band round trip delay estimate to the corresponding optical network unit based on the in-band ranging signal received during the respective quiet window.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
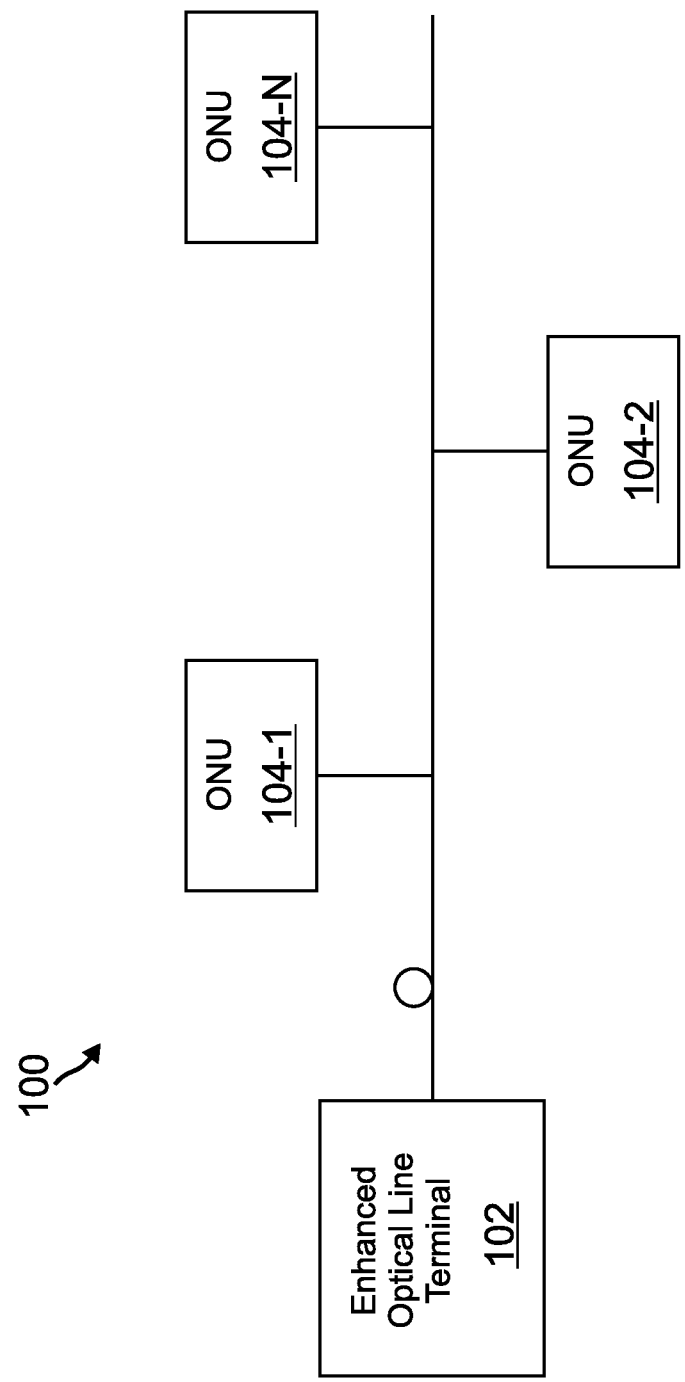
FIG. 1 is a high level block diagram of one embodiment of an exemplary optical network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of an exemplary optical network 100 which implements an enhanced optical line terminal (OLT) 102. The optical network 100 can be implemented using any appropriate optical network technology, such as, but not limited to, Gigabit Passive Optical Networks (GPON), 10 Gigabit Passive Optical Networks (XG-PON), or Next Generation Passive Optical Networks (NG-PON). The enhanced OLT 102 is communicatively coupled to a plurality of optical network units (ONU) 104-1 . . . 104-N via optical fiber 106. During operation, the enhanced OLT 102 is configured to broadcast a discovery request to the plurality of ONUs 104. A broadcast discovery request is a single request transmitted to all ONUs 104 coupled to the OLT 102. The discovery request prompts all ONUs 104 which receive the discovery request to respond which enables the OLT 102 to detect which ONUs 104 are coupled to the OLT 102, as understood by one of skill in the art. The discovery request can be broadcast at initialization of the system 100 and/or at other predefined moments of time, as understood by one of skill in the art. Each ONU 104 responds to the discovery request with a respective discovery response which contains the serial number of the respective ONU 104. Upon receiving each discovery response, the OLT 102 identifies the respective serial number and maintains a record of all ONUs 104 coupled to the OLT 102. The discovery request and discovery responses are used to identify which ONUs 104 are coupled to the OLT 102.

In order to convey the serial number and/or other data, the discovery response is modulated. Some exemplary modulation techniques used in various implementations include, but are not limited to, phase shift keying and frequency shift keying. Phase shift keying and frequency shift keying are known to one of skill in the art and not described in more detail herein. Additionally, the discovery response is modulated onto the same carrier signal used by traffic bearing signals or data traffic. In other words, a dedicated channel is not used to communicate the discovery response. In order to avoid interference with the data traffic, the discovery response is transmitted as an out-of-band signal. Traffic bearing signals or data traffic refers to the data communicated over the network related to the services provided by the network, as understood by one of skill in the art. Additionally, as understood by one of skill in the art, an out-of-band signal is a signal that is transmitted outside of the established characteristics for the data traffic (also referred to herein as the data signal).

For example, the out-of-band signal can be modulated at a lower frequency or at a higher frequency than the data traffic signal, but modulated onto the same carrier wave as the data traffic signal. In other words, regardless of the modulation technique used, such as phase shift keying or frequency shift keying, the frequency content can be made low by reducing the data rate of the out-of-band signal. Typically, lower frequency content results in less impact to the data traffic channel than higher frequency content. Additionally, in some embodiments, the out-of-band signal can be transmitted as a spread spectrum signal or using a low power orthogonal frequency division multiplexing (OFDM) signal at high or low frequency. The out-of-band signal is also transmitted at lower power than the data signal to reduce interference with the data signal.

In addition to identifying the serial number from the out-of-band discovery response, the enhanced OLT 102 is configured to determine an approximate range to each of the ONUs 104 based on the respective out-of-band discovery response. That is, the enhanced OLT 102 measures an estimate of the Round Trip Delay (RTD) between the OLT 102 and the respective ONU 104 based on the respective discovery response. For example, the phase shift or frequency shift for each bit of the discovery response can occur over a longer period of time if the data rate is low. The enhanced OLT 102 measures the period of time over which the phase or frequency shift occurs in order to obtain an estimate of RTD and the accuracy of the RTD, as described in more detail below with respect to the example shown in FIG. 2. To measure the RTD, the discovery response includes a demarcation point within the signal. For example, in some embodiments, the discovery response includes a preamble for detection purposes and one or more markers are included in the preamble to measure the RTD. As the period of time over which the phase or frequency shift occurs is lengthened, the accuracy of the RTD estimate and the ease of detection of the discovery response may decrease. As the time period is shortened, the ease of detection increases, but the discovery response could impact the data traffic channel. Thus, in some embodiments, the amplitude of the discovery response is also adjusted to enable a compromise between the period of time used for easy detection and the period of time which reduces impact to the data channel.

The estimate of the RTD derived from the out-of-band discovery response is determined to within some determined error range or accuracy level. For example, the RTD estimate can be determined to within an error range of ±10 microseconds. The specific error range depends on the implementation and can vary from ONU 104 to ONU 104. In addition, the error range can vary from estimate to estimate for the same ONU 104. The error range can be determined using statistical analysis known to one skill in the art, for example. As used herein, the RTD estimate that is based on the out-of-band signal is also referred to as an out-of-band RTD estimate.

Based on the out-of-band RTD estimate and the determined error range or accuracy, the OLT 102 calculates a duration of a quiet window and a start time of the quiet window for the respective ONU 104 corresponding to the discovery response used to estimate the RTD. As used herein, a quiet window refers to a period of time during which data traffic is not transmitted. The OLT 102 is responsible for enforcing the quiet window, as understood by one of skill in the art. The quiet window is used to determine a precise RTD estimate. For example, the OLT 102 transmits a signal to a respective ONU 104 discovered via the discovery responses. The signal can be a query or a signal indicating when the respective ONU 104 is to transmit an in-band ranging signal. In other words, the ranging signal is transmitted within the established characteristics for the data traffic. The respective ONU 104 transmits the ranging signal to the OLT 102 during the quiet window. The OLT 102 measures the elapsed time between when the respective ONU 104 is to transmit and when the ranging signal is received by the OLT 102 to determine a precise RTD estimate based on the in-band ranging signal. The precise RTD estimate based on the in-band ranging signal is also referred to herein as an in-band RTD estimate.

As mentioned above, the OLT 102 determines the duration of each quiet window based on a respective out-of-band RTD estimate to the corresponding ONU 104. For example, in a conventional optical network, a range of approximately 40 kilometers from the OLT might require a quiet window of 200 microseconds for each ONU to ensure the ranging signal from the ONU is received. However, in the embodiments described herein, the OLT individually determines the duration of the quiet window for each respective ONU 104 based on the RTD estimated from the out of band response from the respective ONU 104. For example, if the out-of-band RTD estimate for a given ONU 104 is estimated to within ±10 microseconds, the OLT 102 determines the duration of the corresponding quiet window to be 20 microseconds. If the out-of-band RTD estimate for a different ONU 104 is determined to be within ±5 microseconds, the OLT 102 determines the duration of the corresponding quiet window to be 10 microseconds. Thus, the OLT 102 described herein reduces the jitter and latency associated with the quiet or ranging window by enabling the duration of the quiet window to be determined individually for each ONU 104. In addition, the duration of the quiet window can be shortened based on the out-of-band RTD estimate as compared to conventional systems which determine the same duration of the quiet window for each ONU based on a worst case estimate.

Furthermore, the duration of each respective quiet window can dynamically change during operation of the network. For example, although an out-of-band discovery response is discussed above for calculating a RTD estimate, other out-of-band signals can be used at other points in time in addition to or in lieu of the out-of-band discovery response to calculate RTD estimates. For example, if a first out-of-band RTD estimate is determined within ±15 microseconds, the corresponding quiet window has a duration of 30 microseconds. If a subsequent out-of-band RTD estimate for the same ONU 104 based on a subsequent out-of-band signal is determined within ±5 microseconds, the subsequent corresponding quiet window has a duration of 10 microseconds. Thus, the duration of the quiet window associated with each respective ONU 104 can be changed dynamically as environment conditions, such as noise, change.

In addition to determining the duration of the respective quiet window for each ONU 104, the OLT 102 also determines when to start or initiate the respective quiet window based on the respective out-of-band RTD estimate for each ONU 104. In particular, in some embodiments, the OLT 102 starts the respective quiet window such that the time from sending a ranging request from the OLT 102 to the center of the respective quiet window is equal to the out-of-band RTD estimate. For example, if the RTD estimate is 200 microseconds, the OLT 102 initiates the respective quiet window such that the center of the quiet window occurs 200 microseconds after OLT 102 sends a ranging request to the respective ONU 104. Additionally, in other embodiments, the OLT 102 anticipates when the respective ONU 104 is going to send the ranging signal and initiates the respective quiet window so that the center of the quiet window occurs when the OLT 102 anticipates the ranging signal being sent. For example, in some such embodiments, the OLT 102 assigns respective delays to the ONUs 104 such that each ONU 104 sends a ranging signal at a respective amount of time after a ranging request. Through the use of a time map, the ONUs 104 do not talk over or interfere with one another. In addition, the specific delays can be calculated based on the respective estimated out-of-band RTD and the respective accuracy of the out-of-band RTD estimate.

During the respective quiet window, the corresponding ONU 104 transmits a ranging signal which is received by the OLT 102. A ranging signal is a signal transmitted by an ONU 104 during the respective quiet window which enables the OLT 102 to measure the round trip delay to the corresponding ONU 104. The OLT 102 measures the time from sending a request to the respective ONU 104 and receiving the ranging signal from the respective ONU 104 to determine a precision RTD estimate, in some embodiments. In other embodiments, the OLT 102 measures the time from which the respective ONU 104 is to transmit the ranging signal to the time that the OLT 102 receives the ranging signal. As used herein, the precision or in-band RTD estimate is an estimate which has an accuracy within a predetermined error range. For example, in some embodiments, the error range for a precision RTD estimate is on the order of nanoseconds, such as, but not limited to, 10 nanoseconds, for example.

Figure 2:
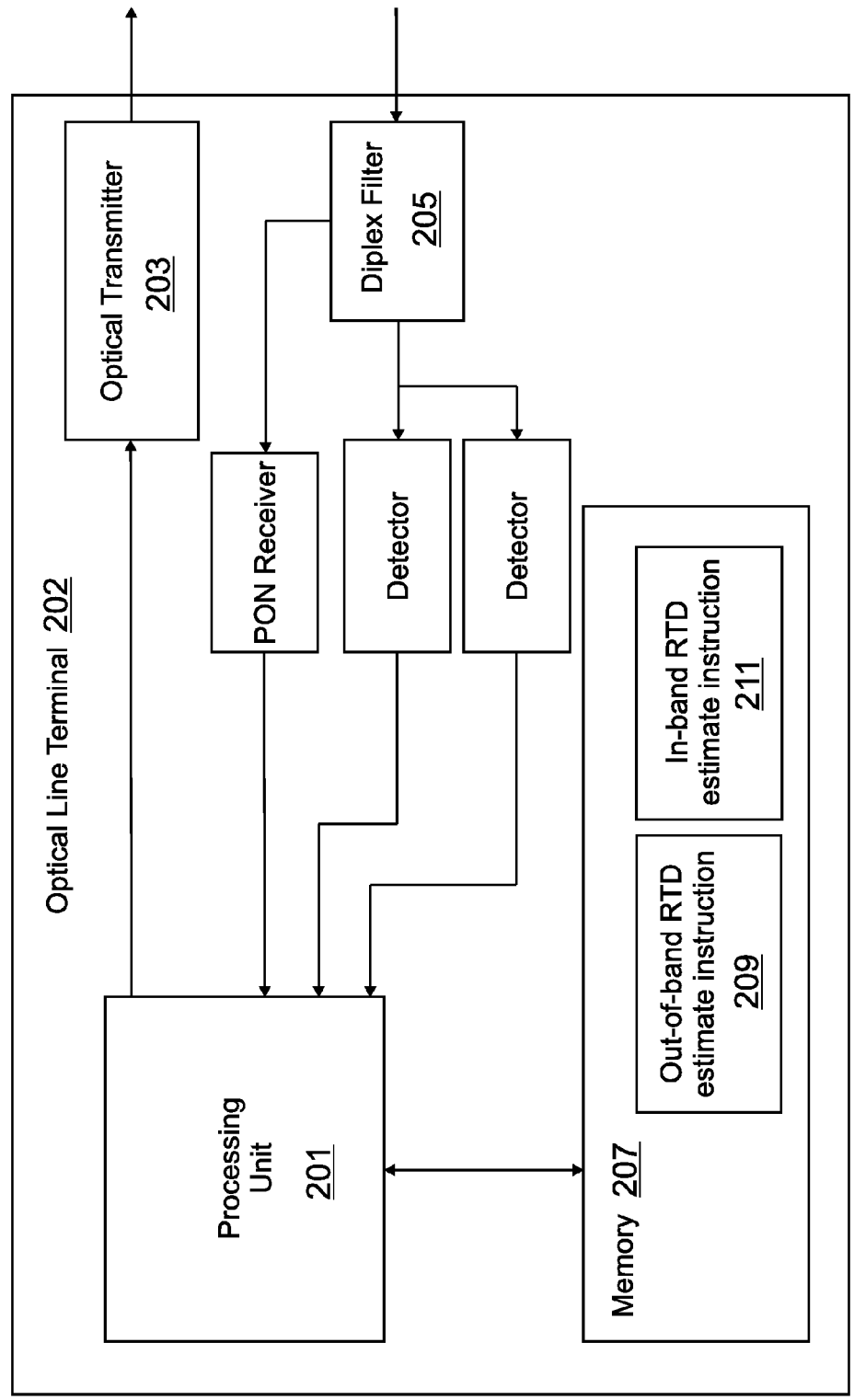
FIG. 2 is a high level block diagram of one embodiment of an exemplary enhanced optical line terminal.

FIG. 2 is a high level block diagram depicting an exemplary enhanced optical line terminal 202 which can be used in system 100 to individually determine the duration of respective quiet windows. The enhanced OLT 202 includes an optical transmitter 203 configured to convert electrical signals received from the processing unit 201 into optical signals and to transmit the optical signals over a fiber optic medium. The enhanced OLT 202 also includes a diplex filter 205 which is configured to separate the out-of-band signal from the data signal. For example, as discussed above, in some embodiments the out-of-band signal is modulated onto the carrier signal at a different frequency than the data signal. Thus, the diplex filter 205 is able to separate the out-of-band signal from the data signal based on the differences in modulation frequency. The data signal is provided to the PON receiver 211 which is configured to convert the optical data signal to an electrical signal and provide the electrical signal to the processing unit 201 for processing, as understood by one of skill in the art.

In the example shown in FIG. 2, the out-of-band signal is modulated using frequency shift keying. However, it is to be understood that other modulation techniques, such as phase-shift keying, can be used in other embodiments. A copy of the out-of-band signal is provided to each of detectors 215 and 217. In this embodiment, the out-of-band signal is a lower frequency signal than the data signal. As such, much of the noise on the received signal is not present in the out-of-band signals since the diplex filter 205 filters the higher frequency signals. Since frequency shift keying is used in this example, each detector 215 and 217 is configured to detect signals at a respective predetermined frequency. Thus, as the frequency of the out-of-band signal shifts, the signal detected at each of the detectors 215 and 217 will rise and fall. In particular, as the signal detected at one of the detectors 215/217 rises, the signal detected at the other detector 217/215 will fall and vice versa. In this way, bits from the out-of-band signal are decoded and the start and end of the out-of-band signal can be detected.

Figure 4:
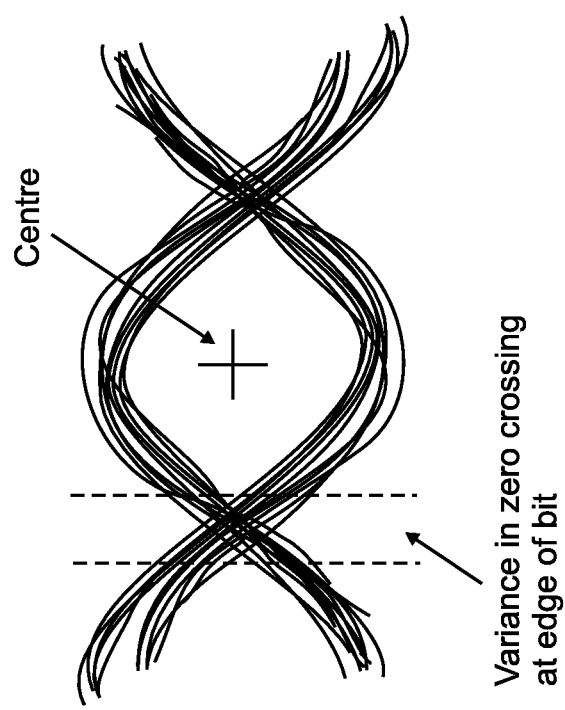
FIG. 4 depicts an exemplary eye diagram.

Since the OLT 202 communicates a signal to each of the ONU that indicates when an ONU is to send the out-of-band signal, the OLT 202 can estimate the approximate RTD based on the time between when the ONU is to transmit and when the detectors 215/217 detect the start of the out-of-band signal. In addition, by decoding a plurality of the bits in the out-of-band signal, the location of the center of a bit can be determined. However, there will be variance in the location of the edges of the bit, similar to an eye diagram, such as the exemplary eye diagram shown in FIG. 4. The variance in the edge of the eye diagram is used by the processing unit 201 to determine the accuracy or error range of the out-of-band RTD estimate.

The processing unit 201 includes or functions with software programs, firmware or other computer readable instructions for carrying out various methods, process tasks, calculations, and control functions, used in estimating the RTD based on out-of-band signals received from respective ONUs and calculating the duration of the corresponding quiet windows based on the out-of-band RTD estimates, as discussed above.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

For example, memory 207 includes out-of-band RTD estimate instructions 209. The out-of-band RTD estimate instructions 209 are configured to cause the processing unit 201 to estimate a round trip delay to a specific ONU based on an out-of-band signal received from a respective ONU, as discussed above. Memory 207 also includes in-band RTD estimate instructions 211. The in-band RTD estimate instructions 211 are configured to cause the processing unit 201 to calculate a duration and start time of a quiet window for a respective ONU based on the corresponding out-of-band RTD estimate which is calculated using the out-of-band signal from the respective ONU. In addition, the in-band RTD estimate instructions 211 are configured to cause the processing unit 201 to transmit a signal to the respective ONU via the optical transmitter 203 to initiate the quiet window and to receive a response from the respective ONU via the optical the optical receiver 205 during the quiet window. The processing unit 201 then calculates a precision in-band RTD estimate to the respective ONU based on the measured elapsed time during the quiet window, as discussed above.

In addition, the processing unit 201 is configured to store on the memory 207 an association between the respective serial number recovered from the out-of-band signal and the respective duration and start time of a quiet window for the corresponding ONU. The processing unit 201 can also store the respective precision RTD estimate associated with each ONU in memory 207. In some embodiments, the processing unit 201 is also configured to dynamically update the size of each respective quiet window based on subsequent out-of-band signals received from each respective optical network unit, as discussed above.

Figure 3:
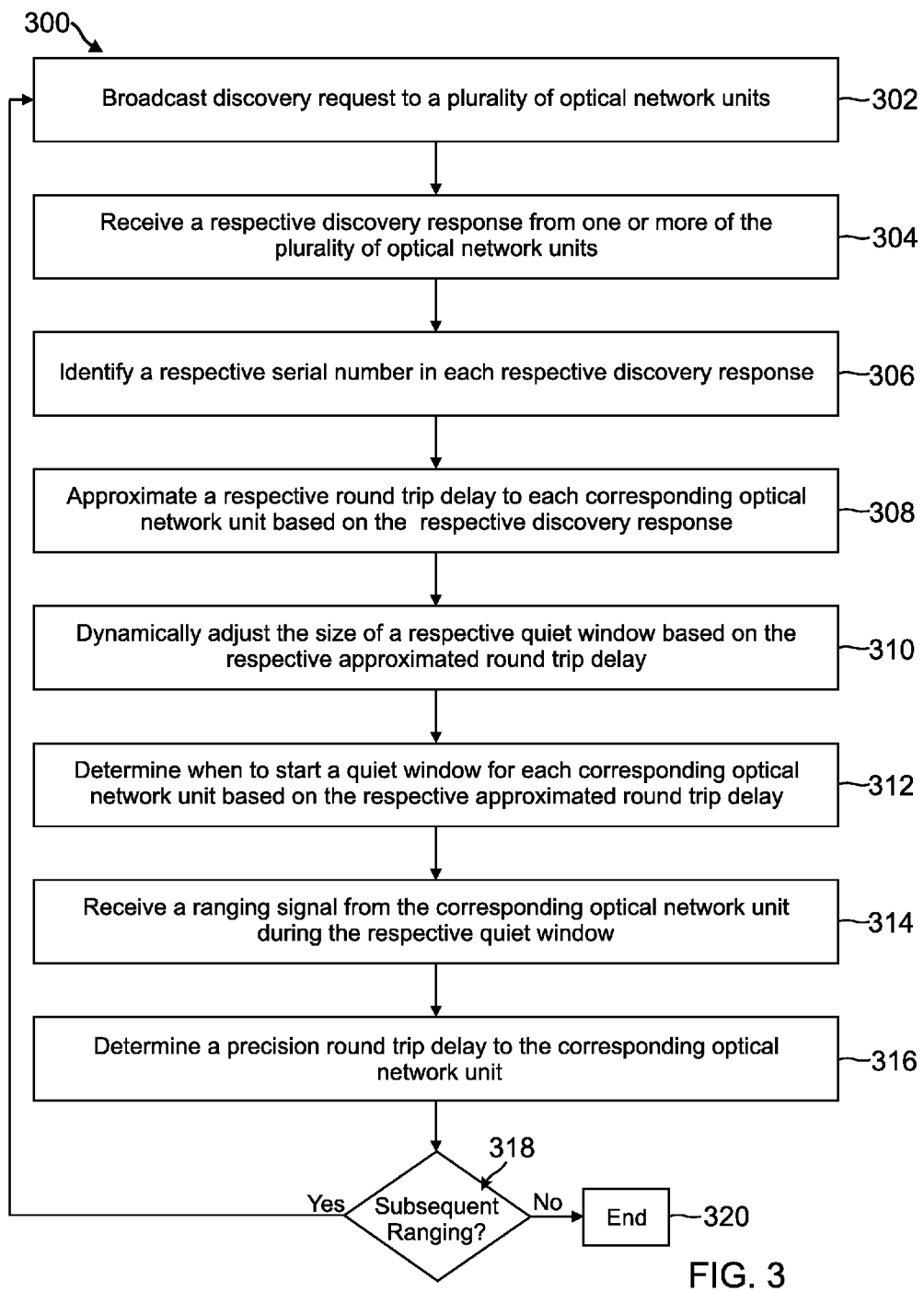
FIG. 3 is a flow chart depicting one embodiment of an exemplary method of ranging in an optical network.

FIG. 3 is a flow chart depicting an exemplary method 300 of ranging which can be implemented in an optical system, such as system 100. At block 302, a discovery request is broadcast to a plurality of optical network units coupled to an optical line terminal. At block 304, a respective discovery response from one or more of the plurality of optical network units is received at the optical line terminal. Each respective discovery response is transmitted as an out-of-band signal on a data channel for traffic bearing signals. At block 306, a respective serial number in each respective discovery response is identified. Each respective serial number identifies the corresponding optical network unit which transmitted the respective discovery response.

At block 308, a respective out-of-band round trip delay to each corresponding optical network unit is approximated based on the respective discovery response, as discussed above. At block 310, the size of a respective quiet window for each optical network unit is dynamically adjusted based on the respective approximated out-of-band round trip delay to the corresponding optical network unit. That is, the duration for each respective quiet window is determined dynamically based on a corresponding approximated round trip delay, as discussed above.

At block 312, the optical line terminal determines when to start a quiet window for each corresponding optical network unit based on the respective approximated out-of-band round trip delay associated with the corresponding optical network unit. At block 314, an in-band ranging signal is received at the optical line terminal from the corresponding optical network unit during the respective quiet window. At block 316, a precision in-band round trip delay to the corresponding optical network unit is determined based on the ranging signal received during the respective quiet window.

At block 318, it is determined if subsequent ranging is to be performed. If subsequent ranging is performed, the method 300 returns to block 304 where subsequent respective out-of-band signals containing respective serial numbers are received. At block 306, the respective approximate out-of-band round trip delay to the corresponding optical network unit is updated based on the subsequent respective out-of-band signal. At block 308, the size of the respective quiet window is dynamically updated based on the respective updated approximate out-of-band round trip delay. At block 310, the optical line terminal determines when to open a subsequent quiet window for the corresponding optical network unit based on the updated approximate out-of-band round trip delay. At block 312, a subsequent in-band ranging signal is received from the corresponding optical network unit during the subsequent quiet window. At block 314, the precision in-band round trip delay estimate is updated based on the subsequent ranging signal.

Example Embodiments

Example 1 includes a method of ranging in an optical network, the method comprising: broadcasting a discovery request to a plurality of optical network units; receiving a respective discovery response from one or more of the plurality of optical network units, wherein each respective discovery response is transmitted as an out-of-band signal on a data channel for traffic bearing signals; identifying a respective serial number in each respective discovery response, each respective serial number identifying a corresponding optical network unit; approximating a respective out-of-band round trip delay to each corresponding optical network unit based on the respective discovery response; dynamically adjusting a size of a respective quiet window for each optical network unit from which a discovery response is received based on the approximated out-of-band round trip delay to the corresponding optical network unit; determining when to start the quiet window for each corresponding optical network unit based on the respective approximated out-of-band round trip delay to the corresponding optical network unit; receiving an in-band ranging signal from the corresponding optical network unit during the respective quiet window; and determining an in-band round trip delay estimate to the corresponding optical network unit based on the in-band ranging signal received during the respective quiet window.

Example 2 includes the method of Example 1, further comprising: updating the respective approximate out-of-band round trip delay to each corresponding optical network unit based on a subsequent respective discovery response received from the corresponding optical network unit; dynamically adjusting the size of a subsequent respective quiet window for each optical network unit based on the respective updated approximated out-of-band round trip delay to the corresponding optical network unit; determining when to start the subsequent respective quiet window for each optical network unit based on the respective updated approximated out-of-band round trip delay to the corresponding optical network unit; receiving a subsequent in-band ranging signal from the corresponding optical network unit during the subsequent respective quiet window; and updating the respective in-band round trip delay estimate to the corresponding optical network unit based on the subsequent in-band ranging signal received during the respective quiet window.

Example 3 includes the method of any of Examples 1-2, wherein each respective discovery response is modulated using one of frequency shift keying or phase shift keying.

Example 4 includes the method of Example 3, wherein approximating the respective out-of-band round trip delay to each corresponding optical network unit based on the respective discovery response comprises measuring a period of time over which the phase or frequency shift occurs in order to approximate the respective out-of-band round trip delay.

Example 5 includes the method of any of Examples 1-4, wherein the modulation frequency of each respective discovery response is higher than the modulation frequency of the data traffic or lower than the modulation frequency of the data traffic.

Example 6 includes the method of any of Examples 1-4, wherein each respective discovery response is transmitted as a spread spectrum signal or using a low power orthogonal frequency division multiplexing (OFDM) signal.

Example 7 includes the method of any of Examples 1-6, further comprising modulating the amplitude of the discovery response.

Example 8 includes an optical network comprising: an enhanced optical line terminal; a plurality of optical network units coupled to the enhanced optical line terminal over a fiber optic medium; wherein the enhanced optical line terminal is configured to estimate a respective out-of-band round trip delay for each of the plurality of optical network units based on a respective out-of-band discovery response received from each of the plurality of optical network units over a data traffic channel, each respective discovery response including a serial number corresponding to the optical network unit which transmitted the respective discovery response; wherein the enhanced optical line terminal associates each respective out-of-band round trip delay estimate with the corresponding optical network unit based on the corresponding serial number; wherein, for each optical network unit, the enhanced optical line terminal is configured to determine a size of a respective quiet window based on the respective out-of-band round trip delay estimate associated with the corresponding optical network unit; wherein the optical line terminal initiates each respective quiet window based on the respective out-of-band round trip delay estimate; wherein each of the plurality of optical network units is configured to transmit a respective in-band ranging signal during the respective quiet window; and wherein the enhanced optical line terminal is configured to measure an in-band round trip delay for each respective optical network unit based on the respective in-band ranging signal.

Example 9 includes the optical network of Example 8, wherein the optical line terminal is configured to dynamically update the size of each respective quiet window based on subsequent out-of-band signals received from each respective optical network unit.

Example 10 includes the optical network of any of Examples 8-9, wherein each of the plurality of optical network units are configured to modulate the respective out-of-band discovery response using one of frequency shift keying or phase shift keying.

Example 11 includes the optical network of Example 10, wherein the enhanced optical line terminal is configured to estimate the respective out-of-band round trip delay for each optical network unit by measuring a period of time over which the phase or frequency shift occurs in order to approximate the respective round trip delay.

Example 12 includes the optical network of any of Examples 8-11, wherein the modulation frequency of each respective discovery response is higher than the modulation frequency of the data traffic or lower than the modulation frequency of the data traffic.

Example 13 includes the optical network of any of Examples 8-11, wherein each respective discovery response is transmitted as a spread spectrum signal or using a low power orthogonal frequency division multiplexing (OFDM) signal.

Example 14 includes the optical network of any of Examples 8-13, wherein each of the plurality of optical network units is configured to modulate the amplitude of the respective out-of-band discovery response.

Example 15 includes an optical line terminal comprising: an optical transmitter configured to transmit optical signals over a fiber optic medium; an optical receiver configured to receive optical signals over the fiber optic medium; a processing unit coupled to the optical transmitter and the optical receiver; wherein the processing unit is configured to cause the optical transmitter to output a discovery request to a plurality of optical network units coupled to the optical line terminal via the fiber optic medium; wherein the optical receiver is configured to provide a respective discovery response received from each of the plurality of optical network units to the processing unit, wherein the respective discovery responses are received as out-of-band signals on the data traffic channel; wherein the processing unit is configured to extract a serial number from each respective discovery request to identify each of the plurality of optical network units and to approximate an out-of-band round trip delay to each of the plurality of optical network units based on the respective discovery response; wherein the processing unit is configured to determine a size of a respective quiet window for each of the plurality of optical network units based on the respective approximate out-of-band round trip delay; wherein the processing unit is configured to initiate the respective quiet window for each of the plurality of optical network units based on the respective approximate out-of-band round trip delay; and wherein the processing unit is configured to measure an in-band round trip delay estimate for each of the plurality of optical network units during the respective quiet window based on an in-band ranging signal received from each of the plurality of optical network signals during the respective quiet window.

Example 16 includes the optical line terminal of Example 15, wherein the respective out-of-band discovery responses are modulated using one of frequency shift keying or phase shift keying Example 17 includes the optical line terminal of Example 16, wherein the processing unit is configured to approximate the out-of-band respective round trip delay for each optical network unit by measuring a period of time over which the phase or frequency shift occurs in order to approximate the respective round trip delay.

Example 18 includes the optical line terminal of any of Examples 15-17, wherein the processing unit is configured to dynamically update the size of each respective quiet window based on subsequent out-of-band signals received by the optical receiver from each respective optical network unit.

Example 19 includes the optical line terminal of any of Examples 15-18, wherein each respective discovery response is received by the optical receiver as a spread spectrum signal or as a low power orthogonal frequency division multiplexing (OFDM) signal.

Example 20 includes the optical line terminal of any of Examples 15-19, further comprising a memory, wherein the processing unit is configured to store in the memory an association between a respective serial number and respective quiet window size for each of the plurality of optical network units coupled to the optical line terminal via the fiber optic medium Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of ranging in an optical network, the method comprising:
    broadcasting a discovery request to a plurality of optical network units;
    receiving a respective discovery response from one or more of the plurality of optical network units, wherein each respective discovery response is transmitted as an out-of-band signal on a data channel for traffic bearing signals;
    identifying a respective serial number in each respective discovery response, each respective serial number identifying a corresponding optical network unit;
    approximating a respective out-of-band round trip delay to each corresponding optical network unit based on the respective discovery response;
    dynamically adjusting a size of a respective quiet window for each optical network unit from which a discovery response is received based on the approximated out-of-band round trip delay to the corresponding optical network unit;
    determining when to start the quiet window for each corresponding optical network unit based on the respective approximated out-of-band round trip delay to the corresponding optical network unit;
    receiving an in-band ranging signal from the corresponding optical network unit during the respective quiet window; and
    determining an in-band round trip delay estimate to the corresponding optical network unit based on the in-band ranging signal received during the respective quiet window.

2. The method of claim 1, further comprising:
updating the respective approximate out-of-band round trip delay to each corresponding optical network unit based on a subsequent respective discovery response received from the corresponding optical network unit;
dynamically adjusting the size of a subsequent respective quiet window for each optical network unit based on the respective updated approximated out-of-band round trip delay to the corresponding optical network unit;
determining when to start the subsequent respective quiet window for each optical network unit based on the respective updated approximated out-of-band round trip delay to the corresponding optical network unit;
receiving a subsequent in-band ranging signal from the corresponding optical network unit during the subsequent respective quiet window; and
updating the respective in-band round trip delay estimate to the corresponding optical network unit based on the subsequent in-band ranging signal received during the respective quiet window.

3. The method of claim 1, wherein each respective discovery response is modulated using one of frequency shift keying or phase shift keying.

4. The method of claim 3, wherein approximating the respective out-of-band round trip delay to each corresponding optical network unit based on the respective discovery response comprises measuring a period of time over which the phase or frequency shift occurs in order to approximate the respective out-of-band round trip delay.

5. The method of claim 1, wherein the modulation frequency of each respective discovery response is higher than the modulation frequency of the data traffic or lower than the modulation frequency of the data traffic.

6. The method of claim 1, wherein each respective discovery response is transmitted as a spread spectrum signal or using a low power orthogonal frequency division multiplexing (OFDM) signal.

7. The method of claim 1, further comprising modulating the amplitude of the discovery response.

8. An optical network comprising:
an enhanced optical line terminal;
a plurality of optical network units coupled to the enhanced optical line terminal over a fiber optic medium;
wherein the enhanced optical line terminal is configured to estimate a respective out-of-band round trip delay for each of the plurality of optical network units based on a respective out-of-band discovery response received from each of the plurality of optical network units over a data traffic channel, each respective discovery response including a serial number corresponding to the optical network unit which transmitted the respective discovery response;
wherein the enhanced optical line terminal associates each respective out-of-band round trip delay estimate with the corresponding optical network unit based on the corresponding serial number;
wherein, for each optical network unit, the enhanced optical line terminal is configured to determine a size of a respective quiet window based on the respective out-of-band round trip delay estimate associated with the corresponding optical network unit;
wherein the optical line terminal initiates each respective quiet window based on the respective out-of-band round trip delay estimate;
wherein each of the plurality of optical network units is configured to transmit a respective in-band ranging signal during the respective quiet window; and
wherein the enhanced optical line terminal is configured to measure an in-band round trip delay for each respective optical network unit based on the respective in-band ranging signal.

9. The optical network of claim 8, wherein the optical line terminal is configured to dynamically update the size of each respective quiet window based on subsequent out-of-band signals received from each respective optical network unit.

10. The optical network of claim 8, wherein each of the plurality of optical network units are configured to modulate the respective out-of-band discovery response using one of frequency shift keying or phase shift keying.

11. The optical network of claim 10, wherein the enhanced optical line terminal is configured to estimate the respective out-of-band round trip delay for each optical network unit by measuring a period of time over which the phase or frequency shift occurs in order to approximate the respective round trip delay.

12. The optical network of claim 8, wherein the modulation frequency of each respective discovery response is higher than the modulation frequency of the data traffic or lower than the modulation frequency of the data traffic.

13. The optical network of claim 8, wherein each respective discovery response is transmitted as a spread spectrum signal or using a low power orthogonal frequency division multiplexing (OFDM) signal.

14. The optical network of claim 8, wherein each of the plurality of optical network units is configured to modulate the amplitude of the respective out-of-band discovery response.

15. An optical line terminal comprising:
an optical transmitter configured to transmit optical signals over a fiber optic medium;
an optical receiver configured to receive optical signals over the fiber optic medium;
a processing unit coupled to the optical transmitter and the optical receiver;
wherein the processing unit is configured to cause the optical transmitter to output a discovery request to a plurality of optical network units coupled to the optical line terminal via the fiber optic medium;
wherein the optical receiver is configured to provide a respective discovery response received from each of the plurality of optical network units to the processing unit, wherein the respective discovery responses are received as out-of-band signals on the data traffic channel;
wherein the processing unit is configured to extract a serial number from each respective discovery request to identify each of the plurality of optical network units and to approximate an out-of-band round trip delay to each of the plurality of optical network units based on the respective discovery response;
wherein the processing unit is configured to determine a size of a respective quiet window for each of the plurality of optical network units based on the respective approximate out-of-band round trip delay;
wherein the processing unit is configured to initiate the respective quiet window for each of the plurality of optical network units based on the respective approximate out-of-band round trip delay; and
wherein the processing unit is configured to measure an in-band round trip delay estimate for each of the plurality of optical network units during the respective quiet window based on an in-band ranging signal received from each of the plurality of optical network signals during the respective quiet window.

16. The optical line terminal of claim 15, wherein the respective out-of-band discovery responses are modulated using one of frequency shift keying or phase shift keying.

17. The optical line terminal of claim 16, wherein the processing unit is configured to approximate the out-of-band respective round trip delay for each optical network unit by measuring a period of time over which the phase or frequency shift occurs in order to approximate the respective round trip delay.

18. The optical line terminal of claim 15, wherein the processing unit is configured to dynamically update the size of each respective quiet window based on subsequent out-of-band signals received by the optical receiver from each respective optical network unit.

19. The optical line terminal of claim 15, wherein each respective discovery response is received by the optical receiver as a spread spectrum signal or as a low power orthogonal frequency division multiplexing (OFDM) signal.

20. The optical line terminal of claim 15, further comprising a memory, wherein the processing unit is configured to store in the memory an association between a respective serial number and respective quiet window size for each of the plurality of optical network units coupled to the optical line terminal via the fiber optic medium.

* * * * *